United States Patent
Zenkner et al.

(10) Patent No.: US 7,534,387 B2
(45) Date of Patent: May 19, 2009

(54) APPARATUS AND METHODS FOR PROCESSING COMPOSITE COMPONENTS USING AN ELASTOMERIC CAUL

(75) Inventors: Grant C. Zenkner, Puyallup, WA (US); Michael P. Thompson, Tacoma, WA (US); Stanley F. Polk, Broken Arrow, OK (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 10/786,885

(22) Filed: Feb. 25, 2004

(65) Prior Publication Data

US 2005/0183818 A1 Aug. 25, 2005

(51) Int. Cl.
*B29C 51/10* (2006.01)
(52) U.S. Cl. .................... 264/313; 264/571
(58) Field of Classification Search ............... 264/102, 264/510–512, 257–258, 324, 571
See application file for complete search history.

(56) References Cited

U.S. PATENT DOCUMENTS

| | | | |
|---|---|---|---|
| 3,334,383 A * | 8/1967 | Irvine | 425/389 |
| 3,703,422 A * | 11/1972 | Yoshino | 156/87 |
| 4,622,091 A * | 11/1986 | Letterman | 156/286 |
| 4,834,929 A | 5/1989 | Dehoff et al. | |
| 4,853,172 A | 8/1989 | Jacaruso et al. | |
| 4,904,436 A | 2/1990 | Rachal | |
| 4,913,639 A | 4/1990 | Wheeler | |
| 4,915,896 A | 4/1990 | Rachal | |
| 4,926,356 A | 5/1990 | Kucera et al. | |
| 4,997,615 A | 3/1991 | Cattanach et al. | |
| 5,023,042 A | 6/1991 | Efferding | |
| 5,123,985 A | 6/1992 | Evans et al. | |
| 5,152,949 A | 10/1992 | Leoni et al. | |
| 5,286,438 A | 2/1994 | Dublinski et al. | |
| 5,292,475 A | 3/1994 | Mead et al. | |
| 5,648,109 A | 7/1997 | Gutowski et al. | |
| 5,807,593 A | 9/1998 | Thompson | |
| 5,817,269 A | 10/1998 | Younie et al. | |
| 5,902,535 A | 5/1999 | Burgess et al. | |
| 6,217,000 B1 | 4/2001 | Younie et al. | |
| 6,245,275 B1 | 6/2001 | Holsinger | |
| 6,290,895 B1 | 9/2001 | Wang et al. | |
| 6,391,246 B2 | 5/2002 | Shiraishi et al. | |
| 6,565,690 B1 | 5/2003 | Cerezo Pancorbo et al. | |
| 6,620,369 B1 * | 9/2003 | Mead | 264/409 |
| 2002/0022422 A1 * | 2/2002 | Waldrop, III et al. | 442/179 |
| 2005/0086916 A1 * | 4/2005 | Caron | 55/382 |

FOREIGN PATENT DOCUMENTS

EP  1 092 529 A1  8/2000
EP  1 162 055  7/2001

* cited by examiner

*Primary Examiner*—Monica A Huson

(57) ABSTRACT

Apparatus and methods for processing composite components using an elastomeric caul are disclosed. In one embodiment, a method of curing a prepreg on a mandrel includes providing an elastomeric caul over the prepreg; providing a vacuum bag over the prepreg and the caul, with the caul between the prepreg and a film of the vacuum bag; and stretching the elastomeric caul over the prepreg while drawing down the vacuum bag over the caul. The caul is stretched to fit snuggly over the prepreg to reduce fiber deformation and wrinkling during curing.

18 Claims, 4 Drawing Sheets

APPARATUS AND METHODS FOR PROCESSING COMPOSITE COMPONENTS USING AN ELASTOMERIC CAUL

FIELD OF THE INVENTION

The present disclosure relates to composite materials processing, and more specifically, to apparatus and methods for processing composite components using an elastomeric caul.

BACKGROUND OF THE INVENTION

Composite parts are being utilized in a wide variety of articles of manufacture due to their high strength and light weight. This is particularly true in the field of aircraft manufacturing. Typical materials used in the manufacture of composite components include glass or graphite fibers that are embedded in resins, such as phenolic, epoxy, and bismaleimide resins. The fiber and resin materials may be formed into a desired shape using a variety of different manufacturing systems and processes, and may then be cured (e.g. under elevated pressure and temperature conditions) to produce the desired component.

It will be appreciated that a wide variety of prior art apparatus and methods exist for forming composite components. For example, some conventional apparatus and methods of forming composite components include those methods generally disclosed, for example, in U.S. Pat. No. 6,565,690 B1 issued to Pancorbo et al., U.S. Pat. No. 6,245,275 B1 issued to Holsinger, U.S. Pat. No. 5,817,269 issued to Younie et al., U.S. Pat. No. 5,902,535 issued to Burgess et al., U.S. Pat. No. 5,292,475 issued to Mead et al., U.S. Pat. No. 5,286,438 issued to Dublinski et al., and U.S. Pat. No. 5,152,949 issued to Leoni et al.

Although desirable results have been achieved using such prior art methods, there is room for improvement. For example, it is known that prior art processes for forming composite components may be susceptible to fiber deformation and wrinkles, particularly on bagside surfaces and along radii of the composite component. These undesirable artifacts of the conventional manufacturing process may increase manufacturing costs due to repair and rework of such composite components. Furthermore, uneven or non-smooth surfaces of the composite components may require complicated shimming during assembly, which may further increase manufacturing costs. Therefore, apparatus and methods for processing composite components that at least partially mitigate these effects would be useful.

SUMMARY OF THE INVENTION

The present invention is directed to apparatus and methods for processing composite components using an elastomeric caul. Apparatus and methods in accordance with the present invention may advantageously reduce fiber deformation and wrinkling of composite components, and may reduce the costs associated with reworking and repair of such composite components, in comparison with the prior art.

In one embodiment, a method of processing a composite component includes providing a lay-up mandrel having a non-planar portion, and forming a prepreg material on the non-planar portion of a lay-up mandrel. The method further includes providing an elastomeric caul over the prepreg material in an initial position such that a first portion of the elastomeric caul is proximate the prepreg material on the lay-up mandrel, and a second portion of the elastomeric caul adjacent the first portion is spaced apart from the prepreg material. Next, a pressure is reduced within a space disposed between the elastomeric caul and the lay-up mandrel proximate the non-planar portion. Simultaneously with the reducing of the pressure with the space, the elastomeric caul is stretched into a second position such that the second portion of the elastomeric caul is drawn proximate to at least one of the prepreg material and the lay-up mandrel. The method may further include curing the prepreg material, such as by subjecting the material to elevated temperature and pressure conditions.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for processing composite components using an elastomeric caul. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details described in the following description.

Figure 1:
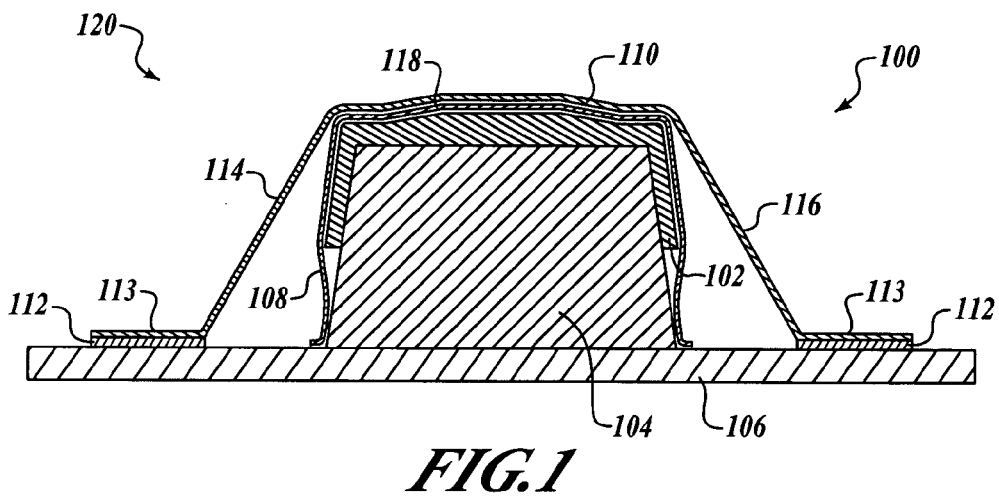
FIG. 1 is an end cross-sectional view of a forming system for manufacturing a composite component in a first stage of operation accordance with an embodiment of the present invention.

FIG. 1 is an end cross-sectional view of a forming system 100 for manufacturing a composite component 102 in accordance with an embodiment of the present invention. In this embodiment, the forming system 100 includes a lay-up mandrel 104 positioned on a base 106. In a first stage of operation 120, the uncured (or prepreg) composite component 102 is formed on the lay-up mandrel 104, and a release film 108 is positioned over the composite component 102. In this embodiment, the uncured composite component 102 is formed on a step-shaped portion of the mandrel 104. A flexible, elastomeric caul 110 is positioned over the release film 108. In this embodiment, a pair of strips of a breather material 112 are coupled to the elastomeric caul 110 proximate an outer edge 113 thereof, and are engaged against the base 106. Alternately, the breather material 112 need not be attached to the caul 110, but rather, may simply be positioned between the caul 110 and the base 106. In further embodiments, the breather material 112 may be placed either above or below the caul 110, or may be eliminated.

As further shown in FIG. 1, the elastomeric caul 110 is positioned over the composite component 102 such that first and second side portions 114, 116 of the elastomeric caul 110 are spaced apart from the release film 108, the composite component 102, and the lay-up mandrel 104. In the first stage of operation 120, the first and second side portions 114, 116 may be tensioned or stretched between the upper portion of the lay-up mandrel 104 and the base 106, or may be untensioned or unstretched. An upper portion 118 of the elastomeric caul 110 is engaged against the release film 108. As described more fully below, one or more attachment devices (not shown) may be positioned about the outer edge 113 of the elastomeric caul 110 to secure the elastomeric caul 110 to the base 106 with the first and second side portions 114, 116 bridged between the upper portion 118 and the base 106.

It will be appreciated that the elastomeric caul 110 may be formed of a variety of suitable materials. For example, the elastomeric caul 110 may be fabricated from silicone rubber, butyl rubber, neoprene, Viton®, or any other suitable elastomeric material. In one particular embodiment, the elastomeric caul 110 may be fabricated from silicone rubber manufactured by Rubber Company, Inc. of Fort Worth, Tex., and commercially-available under Product Number EL80 sold by Torr Technology, Inc. of Auburn, Wash. The elastomeric caul 110 formed of silicone rubber may be any suitable thickness, including, for example, at least 0.080 inches thick. In one particular embodiment, it has been noted that, for certain composite materials processing applications involved in the aerospace industry, the elastomeric caul 110 formed from silicone rubber provides a suitable combination of material characteristics, including elongation, durability, and temperature resistance. It will be appreciated, however, that for other composite materials processing applications, other elastomeric materials may be suitable or preferable, and that therefore, the invention should not be viewed as being limited to the particular elastomeric materials described above.

Figure 2:
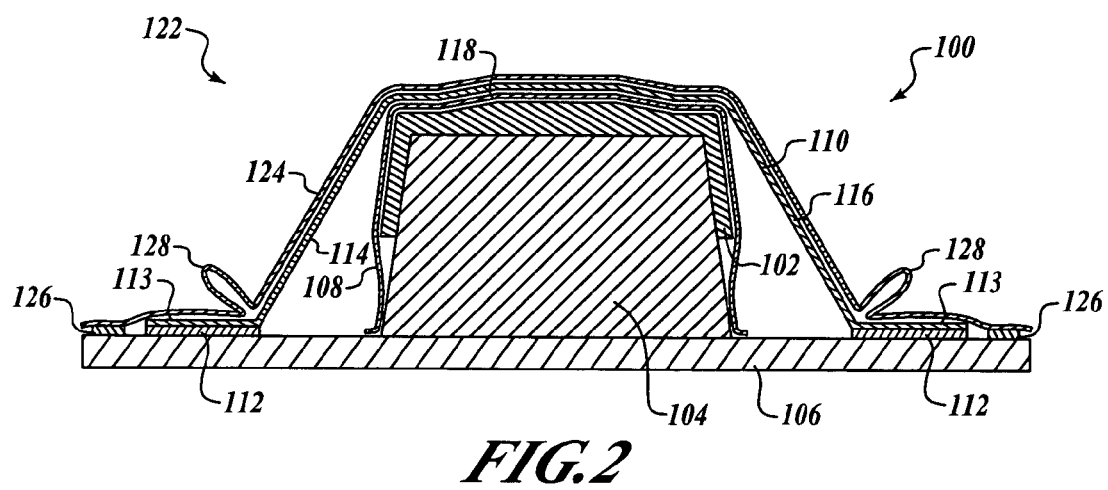
FIG. 2 is an end cross-sectional view of the forming system of FIG. 1 in a second stage of operation.

FIG. 2 is an end cross-sectional view of the forming system 100 of FIG. 1 in a second stage of operation 122. A bagging film 124 is positioned over the elastomeric caul 110. The bagging film 124 extends outwardly beyond the outer edge 113 of the elastomeric caul 110 and is attached to the base 106 by vacuum sealant tape 126. The bagging film 124 is fit loosely over the part, with enough excess material to avoid bridging when vacuum is applied and the bagging film 124 is pulled down over the elastomeric caul 110, the composite component 102, and the mandrel 104. In one particular embodiment, the bagging film 124 includes one or more pleats 128 of additional bagging material such that the bagging film 124 fits loosely over the elastomeric caul 110.

Figure 3:
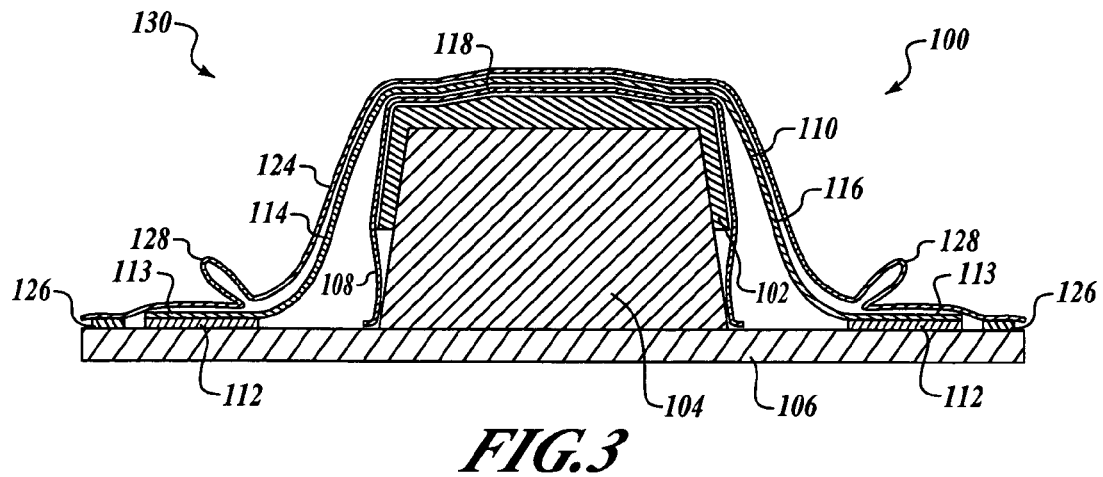
FIG. 3 is an end cross-sectional view of the forming system of FIG. 1 in a third stage of operation.

FIG. 3 is an end cross-sectional view of the forming system 100 of FIG. 1 in a third stage of operation 130 in which a vacuum (or reduced pressure) is formed within the bagging film 124. As shown in FIG. 3, as the vacuum is drawn, the pressure underneath the vacuum bagging film 124 is reduced, and the first and second side portions 114, 116 are drawn inwardly toward the composite component 102 (and the lay-up mandrel 104). As the elastomeric caul 110 is drawn inwardly, the elastomeric caul 110 is stretched, and the pleats 128 of the bagging film 124 begin to unfold and expand. As noted above, it will be appreciated that the pleats 128 are not critical to the operation of the forming system 100, but rather, simply represent one way of providing a suitable quantity of bagging film 124 over the elastomeric caul 110 so that during the evacuation, there is a sufficient quantity of bagging film 124 over the caul 110 to allow the bagging film 124 to come down at all points without bridging.

Figure 4:
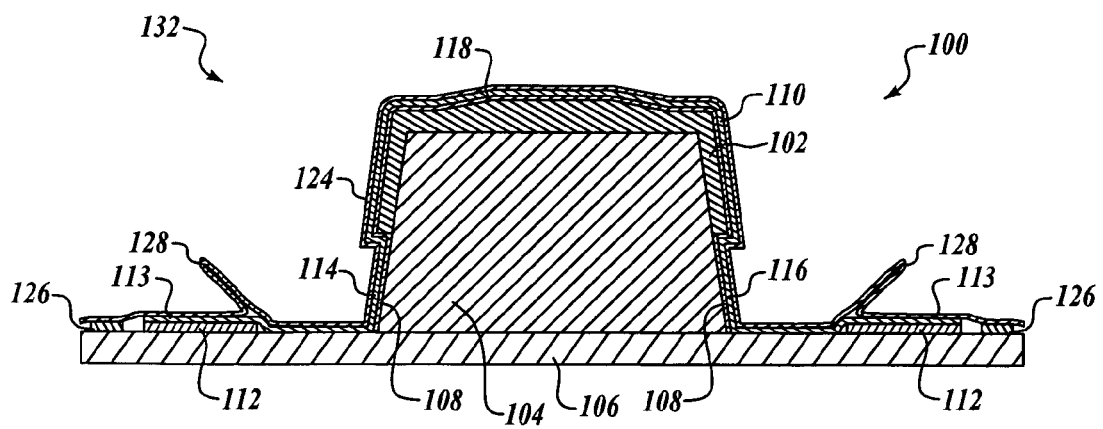
FIG. 4 is an end cross-sectional view of the forming system of FIG. 1 in a fourth stage of operation.

FIG. 4 is an end cross-sectional view of the forming system 100 of FIG. 1 in a fourth stage of operation 132. In this stage, the elastomeric caul 110 has been drawn tightly into engagement with the release film 108 (FIG. 3) by the reduced pressure. More specifically, because the outer edge 113 of the elastomeric caul 110 is secured to the base 106, the elastomeric caul 110 is tightly stretched over the lay-up mandrel 104, the composite component 102, and the release film 108. With at least the side portions 114, 116 (and possibly also the upper portion 118) of the elastomeric caul 110 stretched, the elastomeric caul 110 snugly fits over the composite component 102. In this configuration, the forming system 100 may be treated or processed to achieve its final, cured condition, such as by placing the forming system 100 into an autoclave or other suitable device and subjecting it to elevated temperature and pressure conditions. Alternately, the composite component 102 may be cured in other ways, including, for example, by exposure to microwave or other suitable wavelength irradiation, by exposure to curing chemicals, agents, or gases, or any other suitable curing means.

Apparatus and methods in accordance with the present invention may provide significant advantages over the prior art. For example, because the elastomeric caul 110 is stretched tightly as it is pulled down over the lay-up mandrel 104 and the composite component 102 by the reduced pressure, fiber deformation and wrinkling of the composite component 102 are reduced or eliminated. These effects may be particularly observable on the outer or "bagside" surface of the composite component 102, especially in the radii. Thus, the quality of the composite component 102 may be improved, and the costs associated with reworking and repair of the composite component 102 may be greatly reduced.

In addition, embodiments of the present invention may also provide a substantial labor savings and a disposable material savings. For example, in conventional composites processing, a hand-tailored surface breather is applied over the part to help evacuate air and prevent nylon bag wrinkles from transferring to the bagside surface of the composite component. By using a reusable, elastomeric caul in accordance with the present invention, the breather may be eliminated, saving material cost and labor.

It may be appreciated that the invention is not limited to the particular embodiment described above or shown in FIGS. 1-4, but rather, that a variety of apparatus and methods in accordance with the present invention may be conceived. For example, it may be noted that in alternate embodiments, the release film 108 may be eliminated. Similarly, alternate configurations of breather material or other suitable vacuum ports may be conceived to enable the pressure within the elastomeric caul 110 to be reduced. Furthermore, the elastomeric caul 110 may be bridged to the base 106 by lesser or greater amounts than the particular embodiment shown in FIG. 1, or may even be bridged from a single side of the lay-up mandrel 104 rather than from both sides as shown.

Figure 5:
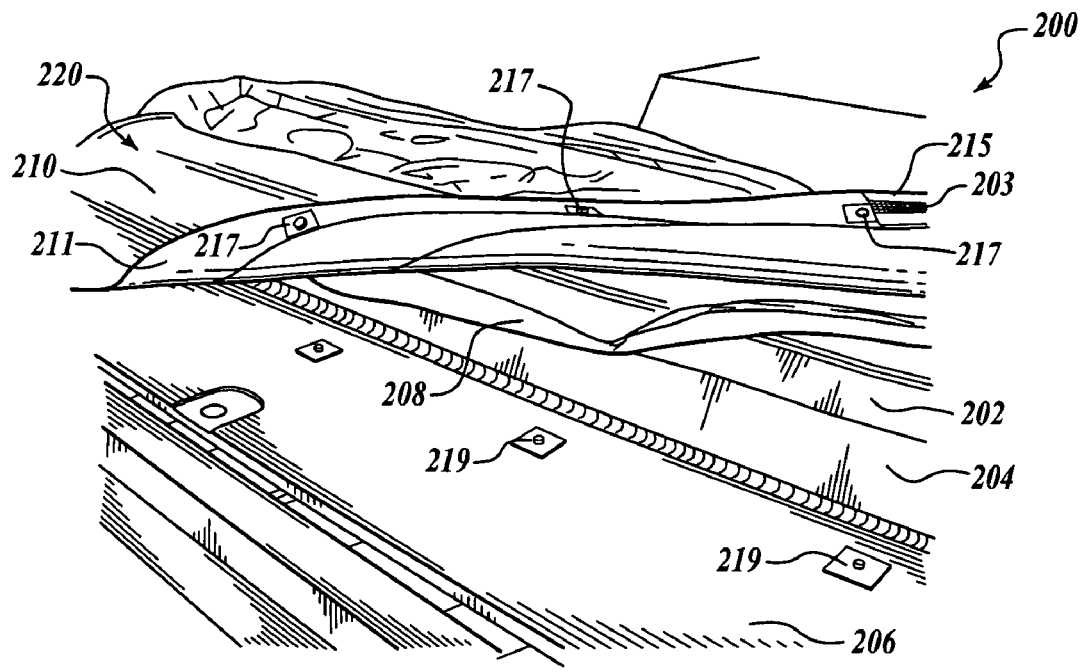
FIG. 5 is an isometric view of a forming system in a first position in accordance with an alternate embodiment of the invention.
Figure 6:
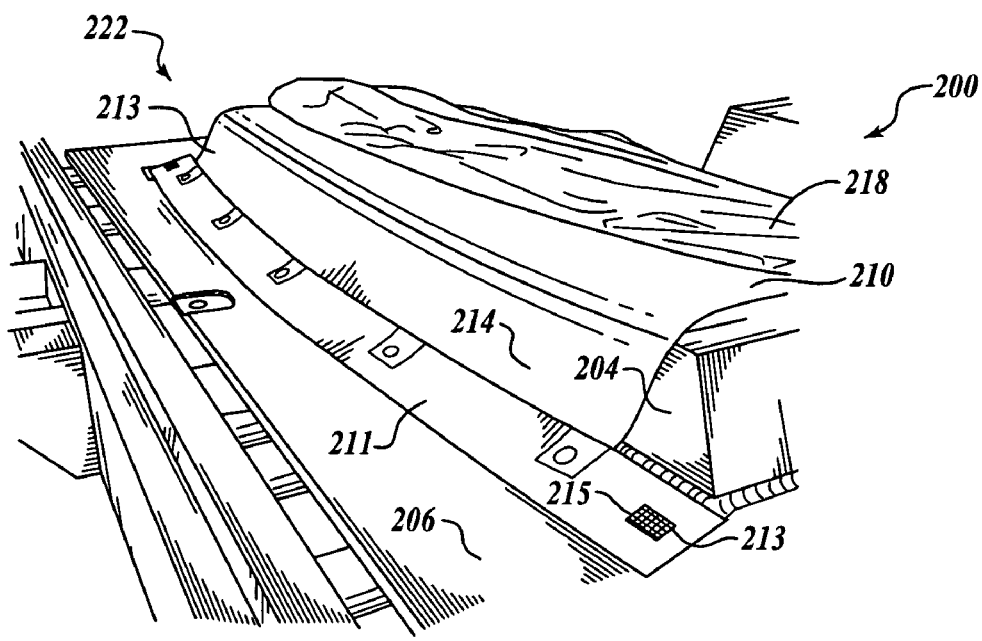
FIG. 6 is an isometric view of the forming system of FIG. 5 in a second position.

FIG. 5 is an isometric view of a forming system 200 in a disengaged position 220 in accordance with an alternate embodiment of the invention. FIG. 6 is an isometric view of the forming system 200 of FIG. 5 in an engaged position 222. In this embodiment, an uncured or partially-cured composite component 202 is positioned on an elongated lay-up mandrel 204 having a base 206, and a release film 208 is positioned over the composite component 202 (FIG. 5). An elastomeric caul 210 is positioned over the release film 208. In this embodiment, the elastomeric caul 210 includes an edge portion 211 having a gas permeable layer 213 disposed therein. The gas permeable layer 213 communicates with the surrounding atmosphere through a plurality of breather ports 215 disposed in the elastomeric caul 210. As best shown in FIG. 5, a plurality of first attachment members 217 are attached to the edge portion 211 of the elastomeric caul 210, and a corresponding plurality of second attachment members 219 are attached to the base 206.

In operation, the first and second attachment members 217, 219 are coupled together (e.g. snapped) such that a first portion 214 (FIG. 6) of the elastomeric caul 210 is spaced apart from the lay-up mandrel 204, as described more fully above. A second portion of the elastomeric caul 210 (not shown) may (or may not) be similarly bridged between the lay-up mandrel 204 and the base 206 on the other side of the lay-up mandrel 204. Subsequently, the vacuum film 218 is positioned over the elastomeric caul 210 and coupled to the base 206 using, for example, vacuum seal tape 126 (FIG. 3). In the manner described above, the pressure between the vacuum film 218 and the base 206 (and lay-up mandrel 204) is reduced so that the elastomeric caul 210 is stretched as it is drawn inwardly about the composite component 202 into a snug fitting engagement with the composite component 202. Thus, the above-referenced advantages of apparatus and methods in accordance with the present invention may be achieved using the forming system 210 having the first and second attachment members 217, 219. It will be appreciated that the attachment members 217, 219 may be replaced with a variety of other types of attachment members 217, 219, including, for example, hook-and-loop fastening strips (e.g. Velcro®), clamping members, or any other suitable attachment devices. Alternately, for some embodiments, it has been determined that attachment members may be eliminated. Without being bound by theory, it is presently believed that for embodiments having no attachments devices, the reduced pressure between the elastomeric caul and the base of the lay-up mandrel operates to secure the outer edge of the elastomeric caul in place during the evacuation stage of the process.

Figure 7:
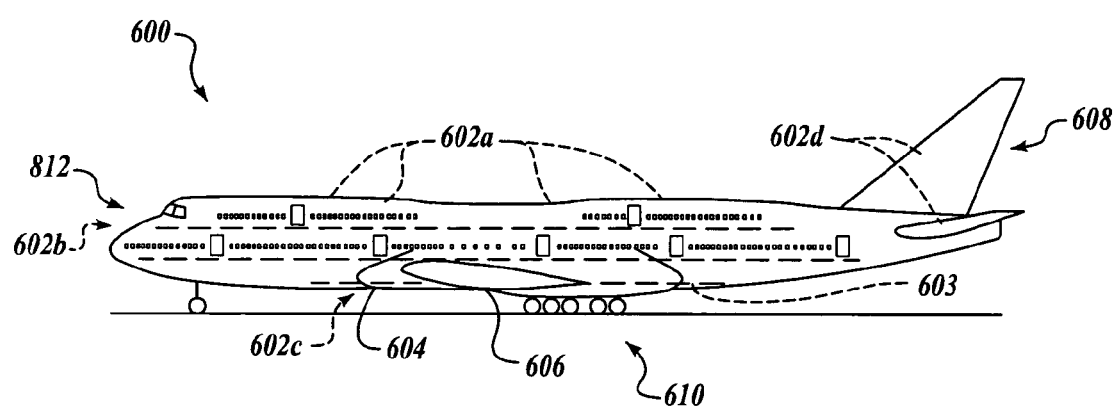
FIG. 7 is a side elevational view of an aircraft having one or more composite components formed in accordance with yet another embodiment of the present invention.

It will be appreciated that a wide variety of apparatus may be conceived that include composite components formed in accordance with alternate embodiments of the present invention, and the invention is not limited to the particular embodiments described above and shown in FIGS. 1-6. For example, FIG. 7 is a side elevational view of an aircraft 600 having one or more composite components 602 formed in accordance with alternate embodiments of the present invention. In general, except for the composite components formed in accordance with the present invention, the various components and subsystems of the aircraft 600 may be of known construction and, for the sake of brevity, will not be described in detail herein.

As shown in FIG. 7, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. It will be appreciated that apparatus and methods in accordance with the present invention may be utilized in the fabrication of any number of composite components 602 of the aircraft 600, including, for example, the various components and sub-components of the tail assembly 608, the wing assemblies 606, the fuselage 605, and any other suitable portion of the aircraft 600. And while the aircraft shown in FIG. 7 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

It may also be appreciated that alternate embodiments of apparatus and methods in accordance with the present invention may be utilized in the manufacture of a wide variety composite components for, for example, boats, automobiles, canoes, surfboards, recreational vehicles, or any other suitable vehicle or assembly. Embodiments of apparatus and methods in accordance with the present invention may be employed in the fabrication of a multitude of composite components, particularly components have a non-planar or arcuate outer surface. This may include, for example, composite components formed on a lay-up mandrel having any type of non-planar (i.e. male or female, concave or convex, etc.) surfaces. In some particular embodiments, for example, composite components fabricated in accordance with the teachings of the present disclosure may have a "C-channel" cross-sectional shape, which is a particularly common geometric shape for a variety of composite components, including but not limited to those used on aircraft (e.g. ribs or other structural members in empennage, wing, and flooring members of the aircraft).

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of curing a prepreg on a mandrel, the method comprising:
    providing an elastomeric caul over the prepreg;
    providing a vacuum bag over the prepreg and the caul, with the caul between the prepreg and a film of the vacuum bag; and
    stretching the elastomeric caul over the prepreg while drawing down the vacuum bag over the caul, the caul being stretched to fit snuggly over the prepreg to reduce fiber deformation and wrinkling during curing.

2. The method of claim 1, further comprising, with the elastomeric caul stretched over the prepreg, applying at least one of an elevated temperature and an elevated pressure to the prepreg to fully-cure partially-cured resin of the prepreg.

3. The method of claim 1, wherein the mandrel includes a step-shaped portion, and wherein the method further comprises forming the prepreg on the step-shaped portion of the mandrel prior to providing the elastomeric caul over the prepreg.

4. The method of claim 3, wherein the step-shaped portion of the mandrel includes an upper step portion, a middle step portion extending downwardly from the upper step portion, and a lower step portion extending away from the middle step portion, and wherein providing the elastomeric caul over the prepreg includes engaging a first portion of the caul with the prepreg on the upper step portion and extending a second portion of the caul between the upper step portion and the lower step portion.

5. The method of claim 4, wherein a third portion of the caul adjacent the second portion and opposite the second portion from the first portion is engaged with the lower step portion of the mandrel.

6. The method of claim 4, wherein a third portion of the elastomeric caul is secured into a fixed position relative to the mandrel, the third portion of the caul being adjacent the second portion and spaced apart from the prepreg.

7. The method of claim 6, wherein securing a third portion of the elastomeric caul includes securing the elastomeric caul using at least one of a snap, a hook-and-loop fastener, and a clamping member.

8. The method of claim 1, further comprising reducing a pressure within a space between the elastomeric caul and the mandrel.

9. The method of claim 1, further comprising providing a release layer between the prepreg and the elastomeric caul.

10. The method of claim 4, wherein a third portion of the caul is adjacent the first portion and spaced apart from the prepreg and wherein stretching the elastomeric caul over the prepreg includes stretching the elastomeric caul such that the third portion is drawn into continuous engagement with at least one of the prepreg material and the lay-up mandrel.

11. A method of manufacturing a component, comprising:
forming a composite material on a non-planar portion of a mandrel;
partially curing the composite material;
after partially curing the composite material, providing an elastomeric caul over the composite material in an initial position such that a first portion of the elastomeric caul is proximate the composite material on the lay-up mandrel, and a second portion of the elastomeric caul adjacent the first portion is spaced apart from the composite material such that a void is formed between the second portion and the prepreg material, the second portion having a perimeter non-sealingly engaged with the mandrel;
providing a bagging film over the elastomeric caul;
sealing the bagging film to the lay-up mandrel;
applying a vacuum under the bagging film and thereby reducing a pressure between the elastomeric caul and the lay-up mandrel;
stretching the elastomeric caul due to the pressure reduction into a second position such that the second portion of the elastomeric caul is drawn proximate to at least one of the composite material and the lay-up mandrel; and
fully-curing the partially-cured resin of the composite material with the elastomeric caul stretched into the second position.

12. The method of claim 11, wherein curing the composite material includes applying at least one of an elevated temperature and an elevated pressure to the composite material.

13. The method of claim 11, wherein providing an elastomeric caul over the composite material in an initial position includes providing a stretchable elastomeric caul wherein, in a relaxed state, the elastomeric caul is not shaped to conform to the non-planar portion.

14. The method of claim 11, wherein forming a composite material on a non-planar portion of a mandrel includes forming the composite material on a step-shaped portion of the mandrel, the step-shaped portion having an upper step portion, a middle step portion extending downwardly from the upper step portion, and a lower step portion extending away from the middle step portion, and wherein providing an elastomeric caul over the composite material in an initial position includes providing the elastomeric caul over the composite material such that the first portion of the caul is engaged with the composite material on the upper step portion and the second portion of the caul extends between the upper step portion and the lower step portion.

15. The method of claim 14, wherein providing an elastomeric caul over the composite material further includes providing the elastomeric caul over the composite material such that a third portion of the caul adjacent the second portion and opposite the second portion from the first portion is engaged with the lower step portion of the mandrel.

16. The method of claim 11, wherein providing an elastomeric caul over the composite material in an initial position includes securing a third portion of the elastomeric caul into a fixed position relative to the mandrel, the third portion of the caul being adjacent the second portion and opposite the second portion from the first portion.

17. The method of claim 11, wherein reducing a pressure within a space disposed between the elastomeric caul and the mandrel includes securing a third portion of the elastomeric caul into a fixed position relative to the mandrel by reducing the pressure within the space.

18. The method of claim 11, wherein providing an elastomeric caul over the composite material in an initial position further includes providing an elastomeric caul having a third portion adjacent the first portion and spaced apart from the composite material, and wherein stretching the elastomeric caul into a second position further includes stretching the elastomeric caul such that the third portion is drawn into continuous engagement with at least one of the composite material and the lay-up mandrel.

* * * * *